United States Patent
Kusano et al.

(10) Patent No.: US 7,589,954 B2
(45) Date of Patent: Sep. 15, 2009

(54) MULTILAYER CERAMIC CAPACITOR

(75) Inventors: Mitsuhiro Kusano, Omihachiman (JP);
Toshiki Nagamoto, Kusatsu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 12/420,609

(22) Filed: Apr. 8, 2009

(65) Prior Publication Data
US 2009/0190285 A1    Jul. 30, 2009

Related U.S. Application Data

(63) Continuation of application No. PCT/JP2007/068240, filed on Sep. 20, 2007.

(30) Foreign Application Priority Data
Sep. 22, 2006 (JP) .............................. 2006-257603

(51) Int. Cl.
*H01G 4/06* (2006.01)
(52) U.S. Cl. .............. 361/321.4; 361/321.1; 361/321.2; 361/313; 361/306.1; 361/306.3; 252/62.2
(58) Field of Classification Search .............. 361/321.4, 361/321.1, 321.2, 321.5, 301.4, 311–313, 361/306.1, 306.3; 252/62.2
See application file for complete search history.

(56) References Cited

U.S. PATENT DOCUMENTS 6,320,738 B1 * 11/2001 Yamana et al. ............ 361/321.2
6,344,963 B1 * 2/2002 Mori ........................ 361/306.3
6,493,207 B2 * 12/2002 Nakano et al. ............ 361/306.3
6,522,521 B2 * 2/2003 Mizuno et al. ............ 361/321.4
6,627,120 B2 * 9/2003 Shimizu .................. 252/521.2
7,339,780 B2 * 3/2008 Sridharan et al. ......... 361/306.1

FOREIGN PATENT DOCUMENTS

| JP | 11054368 A | 2/1999 |
| JP | 2001223132 A | 8/2001 |
| JP | 2003124051 | 4/2003 |
| JP | 2006022258 A | 1/2006 |
| JP | 2006202649 A | 8/2006 |

OTHER PUBLICATIONS

International Search Report for PCT/JP2007/068240 dated Dec. 25, 2007.

* cited by examiner

*Primary Examiner*—Nguyen T Ha
(74) *Attorney, Agent, or Firm*—Dickstein, Shapiro, LLP.

(57) ABSTRACT

Provided is a multilayer ceramic capacitor including external electrodes which also functions as a resistive element, and the external electrodes achieve strong bonding with internal electrodes containing Ni or a Ni alloy. The external electrodes include a resistive electrode layers contacting a ceramic laminate and internal electrodes. The resistive electrode layers contains a complex oxide which reacts with Ni or a Ni alloy contained in the internal electrodes in a proportion of 26 to 79% by weight, a glass component in a proportion of 20 to 56% by weight, and metal which reacts with Ni or a Ni alloy in a proportion of 1 to 18% by weight.

20 Claims, 3 Drawing Sheets

MULTILAYER CERAMIC CAPACITOR

This is a continuation of application Ser. No. PCT/JP2007/068240, filed Sep. 20, 2007.

TECHNICAL FIELD

The present invention relates to a multilayer ceramic capacitor, and particularly to a multilayer ceramic capacitor which serves as a CR composite electronic component by including external electrodes which also function as a resistive element.

BACKGROUND ART

When a multilayer ceramic capacitor is used for decoupling around a CPU, an excessively low equivalent series resistance (ESR) of the multilayer ceramic capacitor causes the problem that oscillation due to parallel resonance occurs on a circuit, resulting in an increase in impedance. In order to avoid this problem, in the multilayer ceramic capacitor for use in the application, there has been a request to control the ESR to several 10 to several 1000 m$\Omega$. As a multilayer ceramic capacitor satisfying the request, a multilayer ceramic capacitor having a resistive element in external electrodes has been proposed.

For example, Japanese Unexamined Patent Application Publication No. 11-54368 (Patent Document 1) discloses, as a CR composite electronic component, a multilayer ceramic capacitor having a specific resistance of external electrodes of $6.9 \times 10^{-6}$ $\Omega$cm or more, while causing a main composition of a conductive material in the external electrodes to contain at least one of Cu and Ni.

Japanese Unexamined Patent Application Publication No. 2001-223132 (Patent Document 2) discloses external electrodes including a three layer structure with a first conductive layer having oxidation-resistant metal, a second conductive layer formed thereon and including a mixture of a conductive oxide and an insulating oxide, and a third conductive layer formed thereon and including oxidation-resistant metal, to thereby increase ESR.

International Publication No. 2006/022258 document (Patent Document 3) discloses external electrodes including a conductive layer containing a complex oxide which reacts with Ni or a Ni alloy and a glass component in a multilayer ceramic capacitor including an internal electrode containing Ni or a Ni alloy. It also disclosed that use of an In—Sn complex oxide as the complex oxide is preferable.

However, the technique disclosed in each of Patent Documents 1 to 3 has following problems to be solved.

Since the external electrodes contain conductive metal, such as at least one of Cu and Ni, as a main component according to the technique disclosed in Patent Document 1, at least one of Cu and Ni sinter, causing metallic conduction to be dominant, and thereby obtainment of sufficient resistance (ESR) is difficult. Although Patent Document 1 also discloses increasing the resistance by adding a dissimilar metal to be alloyed, the increase in the resistance by such alloying is as small as about $10^{-6}$ $\Omega$·cm to $10^{-4}$ or $10^{-5}$ $\Omega$·cm. This indicates that, even when the external electrodes of a film thickness of 100 µm are formed on an end surface of a multilayer ceramic capacitor having a planar size of 20 mm×1.2 mm, for example, a resistive component of the external electrodes is about from $10^{-6}$ $\Omega$·cm to $10^{-7}$ $\Omega$·cm, and causes the development of sufficient resistance to be difficult.

In contrast, since the second conductive layer in the external electrodes contains, for example, a ruthenium oxide, a ruthenium oxide compound, or graphite as a main component, sufficient resistance can be obtained according to the technique disclosed in Patent Document 2. However, the technique disclosed in Patent Document 2 has a problem that since expensive metal, such as at least one selected from a group of Pd, Ag, Pt, Au, Rh, Ir, and Ru, for example is used as oxidation-resistant metal forming the first and third conductive layers of the external electrodes, the material cost of the first and third conductive layers increases. The technique disclosed in Patent Document 2 also has a problem that the external electrodes have a three layer structure and each of the first to third conductive layers is formed by being printed and has thick film thickness, so that the thickness of the whole external electrode increases to inhibit reduction in size of component.

The above-described problems encountered in the technique of each of Patent Documents 1 and 2 can be solved by the technique disclosed in Patent Document 3. Briefly, according to the technique of Patent Document 3, sufficient resistance can be obtained without requiring a three layer structure or expensive metal to be used.

However, weather resistance and bonding strength with an internal electrode of the conductive layer which is included in the external electrodes and contains a complex oxide reacting with Ni or a Ni alloy, such as an In—Sn complex oxide, and a glass component according to the technique disclosed in Patent Document 3, are not sufficient. Thus, a favorable bonding state is difficult to maintain against a thermal shock, bending, etc. Patent Document 3 also discloses addition of Ag to control resistance applied by the external electrodes. However, since Ag hardly has a solid solution region with the Ni contained in the internal electrode, the problem that bonding properties with the internal electrode decrease according to an increase of Ag arises. The problem of the favorable bonding with the internal electrode being impeded causes reduction of electrostatic capacitance applied by a multilayer ceramic capacitor.

Patent Document 1: Japanese Unexamined Patent Application Publication No. 11-54368

Patent Document 2: Japanese Unexamined Patent Application Publication No. 2001-223132

Patent Document 3: International Publication No. 2006/022258 document

DISCLOSURE OF INVENTION

Problems to be Solved by the Invention

An object of the present invention is to provide a multilayer ceramic capacitor including external electrodes capable of solving the above-described problems.

Means for Solving the Problems

The present invention is directed to a multilayer ceramic capacitor, including: a ceramic laminate having a plurality of ceramic layers; internal electrodes formed along specific interfaces between the ceramic layers inside the ceramic laminate; and external electrodes formed on outer surfaces of the ceramic laminate and electrically connected to specific internal electrodes, the internal electrodes containing Ni or a Ni alloy. In order to solve the above-described technical problems, the present invention is characterized to have following structures.

More specifically, according to a first aspect of the invention, the external electrodes have resistive electrode layers contacting the ceramic laminate and the specific internal electrodes. The resistive electrode layers contain a complex oxide which reacts with Ni or a Ni alloy, a glass component, and metal which reacts with Ni or a Ni alloy. In the resistive electrode layers, the complex oxide is contained in a proportion of 26 to 79% by weight, the glass component is contained in a proportion of 20 to 56% by weight, and the metal is contained in a proportion of 1 to 18% by weight.

The metal which reacts with Ni or a Ni alloy is preferably at least one of Ni and Cu.

The complex oxide which reacts with Ni or a Ni alloy is preferably an In—Sn complex oxide.

According to a second aspect of the invention, each of the external electrodes has a conduction layer contacting the ceramic laminate, the specific internal electrodes, and a resistive electrode layer contacting the outer surfaces of the conduction layer. The conduction layer contains metal which reacts with Ni or a Ni alloy as a main component. The resistive electrode layers contain a complex oxide which reacts with Ni or a Ni alloy in a proportion of 26 to 79% by weight, a glass component in a proportion of 20 to 56%, and metal which reacts with Ni or a Ni alloy in a proportion of 1 to 18% by weight similarly as the first aspect of the present invention.

In the second aspect, the metal serving as a main component of the conduction layer is preferably at least one of Ni and Cu.

Moreover, also in the second aspect, the metal which reacts with Ni or a Ni alloy in the resistive electrode layers is preferably at least one of Ni and Cu, and the complex oxide which reacts with Ni or a Ni alloy is preferably an In—Sn complex oxide similar to the case of the first aspect.

In the invention, outer electrode layers may be formed by being printed on the external electrodes such that the outer electrode layers contact the outer surfaces of the resistive electrode layers. In this case, the outer electrode layers preferably contain a glass component having a glass softening point which is 30° C. or less lower than a glass softening point of the glass component contained in the resistive electrode layers. In particular, more preferably, the glass components contained in the outer electrode layers have a same composition system as a composition system of the glass component contained in the resistive electrode layers. The "same composition system" with respect to the glass component means the main glass forming materials are identical.

ADVANTAGES

According to the first aspect of the present invention, the complex oxide which reacts with Ni or a Ni alloy contained in the resistive electrode layers contacting the internal electrodes is partially substituted with the metal which reacts (forms a solid solution or a compound) with Ni or a Ni alloy, and thus sufficient bonding properties between the internal electrodes containing Ni or a Ni alloy can be achieved, and the weather resistance can be increased.

According to the second aspect, the conduction layer containing, as a main component, the metal which reacts with Ni or a Ni alloy is formed in such a manner as to be in contact with the internal electrodes, and then the resistive electrode layers containing the metal which reacts with Ni or a Ni alloy is formed in such a manner as to be in contact with the outer surfaces of the conduction layer. Therefore, the conduction layer can impart favorable bonding properties to the internal electrodes and the resistive electrode layers. Thus, a stronger bonding state can be achieved and higher weather resistance can be achieved. Due to the presence of the conduction layer, stable ESR can be obtained irrespective of the number and exposure degree of the internal electrodes.

When at least one of Ni and Cu is used as the metal which reacts with Ni or a Ni alloy in the resistive electrode layers and, in the second aspect, as the metal serving as a main component of the conduction layer, a stronger bonding state can be achieved and the weather resistance can be further increased.

In the invention, when an In—Sn complex oxide is used as the complex oxide which reacts with the Ni or Ni alloy contained in the resistive electrode layers, a stronger bonding state can be achieved.

In the present invention, forming outer electrode layers by printing on the external electrodes in such a manner as to be in contact with the outer surface of the resistive electrode layers, and having the outer electrode layers contain a glass component having a glass softening point which is 30° C. or less lower than the glass softening point of the glass component contained in the resistive electrode, can cause resistance fluctuation due to the formation of the outer electrode layers to be suppressed and the resistance of the multilayer ceramic capacitor can be made stable. In particular, when the composition system of the glass component contained in the outer electrode layers is the same as that of the glass component contained in the resistive electrode layers, the resistance of the multilayer ceramic capacitor can be made more stable.

REFERENCE NUMERALS

Figure 1:
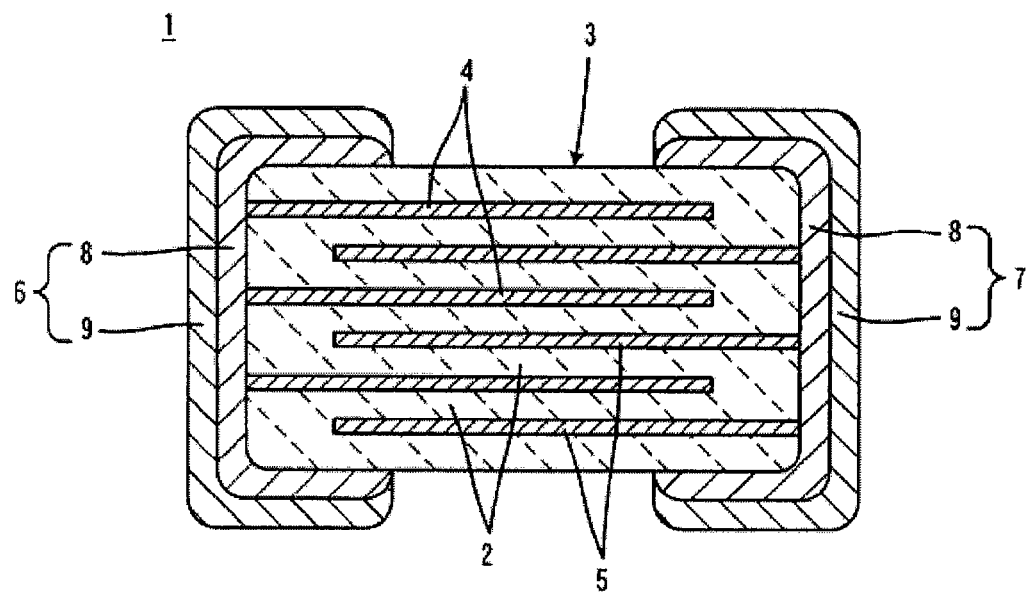
FIG. 1 is a front elevation view schematically illustrating a multilayer ceramic capacitor 1 according to a first embodiment of the present invention as viewed in a cross section in the laminating direction.

1, 11, 21, 31, 1*a*, 1*b* multilayer ceramic capacitor
2 ceramic layer
3 ceramic laminate
4, 5 internal electrode
6,7 external electrode
8 resistive electrode layer
12 ground electrode layer
22 conductive layer

BEST MODE FOR CARRYING OUT THE INVENTION

FIG. 1 illustrates a multilayer ceramic capacitor 1 according to the first embodiment of the present invention.

The multilayer ceramic capacitor 1 has a rectangular parallelepiped ceramic laminate 3 in which a plurality of ceramic layers 2 containing a dielectric material ceramic are laminated. On the inside of the ceramic laminate 3, internal electrodes 4 and 5 are formed along a specific interface between the ceramic layers 2. The internal electrodes 4 and 5 contain Ni or a Ni alloy as a conductive component. The internal electrodes 4 and 5 are alternately disposed and face with each other with the ceramic layer 2 being interposed therebetween, thereby developing an electrostatic capacitance.

On facing end portions of the outer surface of the ceramic laminate 3, external electrodes 6 and 7 are formed. One external electrode 6 is electrically connected to the internal electrodes 4 and the other external electrode 7 is electrically connected to the internal electrodes 5.

In such a multilayer ceramic capacitor 1, each of the external electrodes 6 and 7 has a resistive electrode layer 8 contacting the ceramic laminate 3 and any one of internal electrodes 4 and 5 and a metal plating layer 9 formed thereon.

The resistive electrode layer 8 functions as a resistive element to the external electrodes 6 and 7, and contains a complex oxide which reacts with Ni or a Ni alloy contained in the internal electrodes 4 and 5, a glass component, and metal which reacts with Ni or a Ni alloy. The complex oxide which reacts with Ni or a Ni alloy is a conductive component having a given resistance. The glass component is an electrically insulating component. The metal which reacts with Ni or a Ni alloy produces a feature of the present invention, and acts in such a manner as to increase the bonding properties with the internal electrodes 4 and 5 containing Ni or a Ni alloy.

As the complex oxide which reacts with Ni or a Ni alloy, an In—Sn complex oxide is preferably used. The In—Sn complex oxide is generally synthesized by forming a solid solution of about 1 to 20% by weight of $SnO_2$ relative to $In_2O_3$. Here, when the proportion of $SnO_2$ is lower than the above-mentioned range, the electrical conductivity of the In—Sn complex oxide decreases. In contrast, when the proportion of $SnO_2$ exceeds the above-mentioned range, a heat treatment required to form a solid solution of $SnO_2$ is performed at a high temperature for a prolonged period of time. Under that circumstance, particles grow, and a pulverizing processing needs to be performed for a prolonged period of time so as to form the particles into powder for use.

When an In—Sn complex oxide is used as the complex oxide which reacts with Ni or a Ni alloy, the resistive electrode layers 8 are formed by applying a paste, which is obtained by kneading In—Sn complex oxide powder, glass frit, powder of metal which reacts with Ni or a Ni alloy, and an organic vehicle containing an organic binder, onto the end portion of the ceramic laminate 3, and printing the same in an $N_2$ atmosphere, for example. In this case, when pastes each individually containing $In_2SO_3$ powder or $SnO_2$ powder are used in place of the In—Sn complex oxide powder synthesized beforehand, solid solution of the pastes hardly progress at a temperature of about 700° C., and thus sufficient electrical conductivity cannot be obtained. Therefore, as the In—Sn complex oxide, a substance is used which has been heat treated at a high temperature beforehand to form a sufficient solid solution.

In the case of the In—Sn complex oxide, the Sn contained therein reacts with Ni or a Ni alloy. As such a complex oxide, an La—Cu complex oxide or an Sr—Fe complex oxide, for example, can also be used in addition to the In—Sn complex oxide. In the case of the La—Cu complex oxide, the Cu reacts with Ni or Ni alloy. In the case of the Sr—Fe complex oxide, Fe reacts with Ni or a Ni alloy.

As metal which reacts with Ni or a Ni alloy contained in the resistive electrode layers 8, Ni, Cu, Fe, etc., are used, and at least one of Ni and Cu is preferably used, for example. Here, the metal which reacts with Ni or a Ni alloy refers to metal forming a solid solution or a compound with Ni or a Ni alloy.

With respect to the content of each component in the resistive electrode layers 8, the complex oxide which reacts with Ni or a Ni alloy is contained in a proportion of 26 to 79% by weight and preferably 55 to 60% by weight; the glass component is contained in a proportion of 20 to 56% by weight and preferably 40 to 45% by weight; and the metal which reacts with Ni or a Ni alloy is contained in a proportion of 1 to 18% by weight.

When the content of the glass component is lower than 20% by weight, the bonding properties between complex oxide powders are poor, resulting in the absence of the resistive electrode layers 8. When the content of the glass component exceeds 56% by weight, glass flows during a baking process, which makes it impossible to maintain the shape of the resistive electrode layers 8. Since the glass component also functions as an electrically insulating component, the resistance of the resistive electrode layers 8 can be adjusted by changing the content in the above-mentioned range. As a result, the ESR of the multilayer ceramic capacitor 1 can be adjusted.

A metal plating layer 9 is formed as required and is not illustrated in detail. It is preferable for the metal plating layer 9 to contain an Ni plating layer as a base and an Sn or solder plating layer to be formed thereon.

Since the complex oxide, such as an In—Sn complex oxide, contained in the resistive electrode layers 8 in the above-described multilayer ceramic capacitor 1 has sufficient reducing resistance, the resistive electrode layers 8 can be printed in a neutral atmosphere or a reducing atmosphere, such as $N_2$ atmosphere. In the printing process, when the resistive electrode layers 8 contain the In—Sn complex oxide, an Ni—Sn intermetallic compound is generated between the In—Sn complex oxide and Ni or a Ni alloy contained in the internal electrodes 4 and 5; when the La—Cu complex oxide is contained, an Ni—Cu intermetallic compound is generated; and when the Sr—Fe complex oxide is contained, an Ni—Fe intermetallic compound is generated. These intermetallic compounds act in such a manner as to secure a highly reliable electric connection state between the resistive electrode layers 8 and the internal electrodes 4 and 5.

The resistive electrode layers 8 contain metal which reacts with Ni or a Ni alloy in addition to the above-described complex oxide. The metal acts in such a manner as to achieve a stronger bonding state between the resistive electrode layers 8 and the internal electrodes 4 and 5 and also increase the weather resistance.

The metal which reacts with Ni or a Ni alloy is contained in a proportion of 1 to 18% by weight in the resistive electrode layers 8. When the content is lower than 1% by weight, the above-described effects obtained by blending the metal are not sufficiently developed. In contrast, when the content thereof exceeds 18% by weight, metallic conduction due to the metal which reacts with Ni or a Ni alloy becomes dominant, resulting in that the functions as a resistive element which are provided by the complex oxide and the glass component are not substantially developed.

Based on the above description, the content of the complex oxide which reacts with Ni or a Ni alloy in the resistive electrode layers 8 is preferably from 26 to 79% by weight, which is equal to the balance of the content of the glass component and the metal which reacts with Ni or a Ni alloy.

The presence of the metal plating layer 9 further increases the weather resistance of the multilayer ceramic capacitor 1 and makes it possible to impart favorable soldering properties to the external electrodes 6 and 7 when the multilayer ceramic capacitor 1 is mounted.

Figure 2:
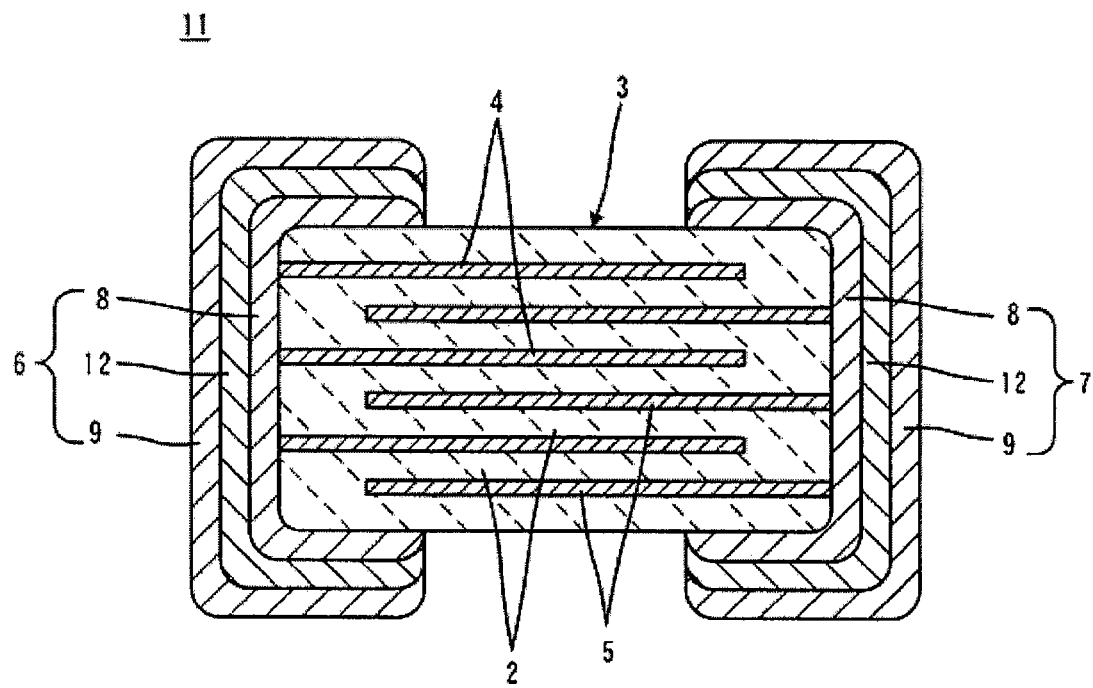
FIG. 2 is a front elevation view schematically illustrating a multilayer ceramic capacitor 11 according to a second embodiment of the present invention as viewed in a cross section in the laminating direction.

FIG. 2 illustrates a multilayer ceramic capacitor according to the second embodiment of the present invention. A multilayer ceramic capacitor 11 illustrated in FIG. 2 has many components in common with the multilayer ceramic capacitor 1 illustrated in FIG. 1. Therefore, the components equivalent to the components illustrated in FIG. 1 are designated with the same reference numerals in FIG. 2, and the repeated descriptions are omitted.

The multilayer ceramic capacitor 11 illustrated in FIG. 2 further include outer electrode layers 12 in each of the external electrodes 6 and 7. The ground electrode layer 12 is formed between the resistive electrode layers 8 and the metal plating layer 9 in such a manner as to be in contact with the outer surfaces of the resistive electrode layers 8. The ground electrode layer 12 can be formed by applying a paste containing metal powder, such as Cu powder or Cu alloy powder, glass frit, and an organic vehicle onto the resistive electrode layers 8 in such a manner as to cover the same, and printing, for example.

During the printing process for the formation of the outer electrode layers 12, it is found that the glass component contained therein diffuses into the resistive electrode layers 8 causing the resistance to fluctuate. In order to solve this problem, it is important not to excessively lower the glass softening point of the glass component contained in the outer electrode layer 12, compared with the glass softening point of the glass component contained in the resistive electrode layers 8. More specifically, it is preferable for the glass component of the glass frit contained in the paste used for the formation of the outer electrode layers 12 to have a glass softening point which is 30° C. or less lower than the glass softening point of the glass component of the glass frit contained in the paste used for the formation of the resistive electrode layers 8. Thus, the resistance fluctuation caused by the formation of the outer electrode layers 12 can be suppressed, and the resistance of the multilayer ceramic capacitor 11 can be made stable.

Moreover, it is found that the resistance fluctuates depending on the dissolved amount of a resistive component, such as the complex oxide contained in the resistive electrode layers 8, into the glass. In order to solve the problem, it is preferable that the composition system of the glass component contained in the outer electrode layers 12 be the same as the composition system of the glass component contained in the resistive electrode layers 8. Then, the glass component of the glass frit contained in the paste used for the formation of the outer electrode layers 12 is made to be the same as the composition system of the glass component of the glass frit contained in the paste for the formation of the resistive electrode layers 8. Thus, the resistance of the multilayer ceramic capacitor 11 can be made more stable, and controllability of the ESR of the multilayer ceramic capacitor 11 can be made more favorable.

According to the second embodiment, the weather resistance of the multilayer ceramic capacitor 11 can be further increased due to the presence of the outer electrode layers 12, and also sufficient plating resistance against a plating process for the formation of the metal plating layer 9 can be imparted to the multilayer ceramic capacitor 11.

Figure 3:
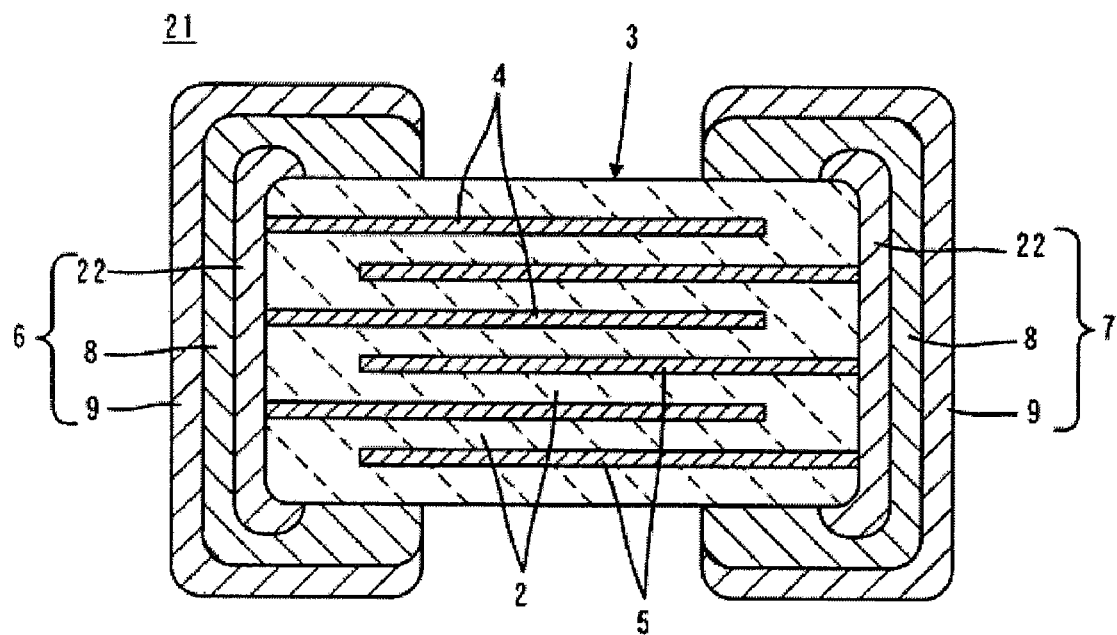
FIG. 3 is a front elevation view schematically illustrating a multilayer ceramic capacitor 21 according to a third embodiment of the present invention as viewed in a cross section in the laminating direction.

FIG. 3 illustrates a multilayer ceramic capacitor 21 according to the third embodiment of the present invention. The multilayer ceramic capacitor 21 illustrated in FIG. 3 also has many components in common with the multilayer ceramic capacitor 1 illustrated in FIG. 1. Therefore, the components equivalent to the components illustrated in FIG. 1 are designated with the same reference numerals, and the repeated descriptions are omitted.

The multilayer ceramic capacitor 21 illustrated in FIG. 3 further has a conduction layer 22 in each of the external electrodes 6 and 7. The conduction layer 22 is formed in such a manner as to be in contact with the ceramic laminate 3 and the internal electrode 4 or 5, and the resistive electrode layers 8 are formed in such a manner as to be in contact with the outer surfaces of the conduction layer 22. The conduction layer 22 contains, as a main component, metal which reacts with the Ni or a Ni alloy contained in the internal electrodes 4 and 5. As such metal, Ni, Cu, Fe, etc., are used and at least one of Ni and Cu is preferably, used, for example.

The conduction layer 22 is formed by applying a paste containing the metal powder which reacts with Ni or a Ni alloy, glass frit, and an organic vehicle onto the end portion of the ceramic laminate 3, and printing, for example.

The resistive electrode layers 8 are formed by applying a paste containing a complex oxide powder which reacts with Ni or a Ni alloy, glass frit, metal powder which reacts with Ni or a Ni alloy, and an organic binder onto the end portion of the ceramic laminate 3 in such a manner as to cover the conduction layer 22. In the process, it is preferable that the glass frit contained in the paste for the formation of the conduction layer 22 and the glass frit contained in the paste for the formation of the resistive electrode layers 8 be the same.

According to the third embodiment, the conduction layer 22 can be strongly bonded to the internal electrodes 4 and 5 and the resistive electrode layers 8 and also stable ESR can be applied without being influenced by the number and exposure degree of the internal electrodes 4 and 5.

Figure 4:
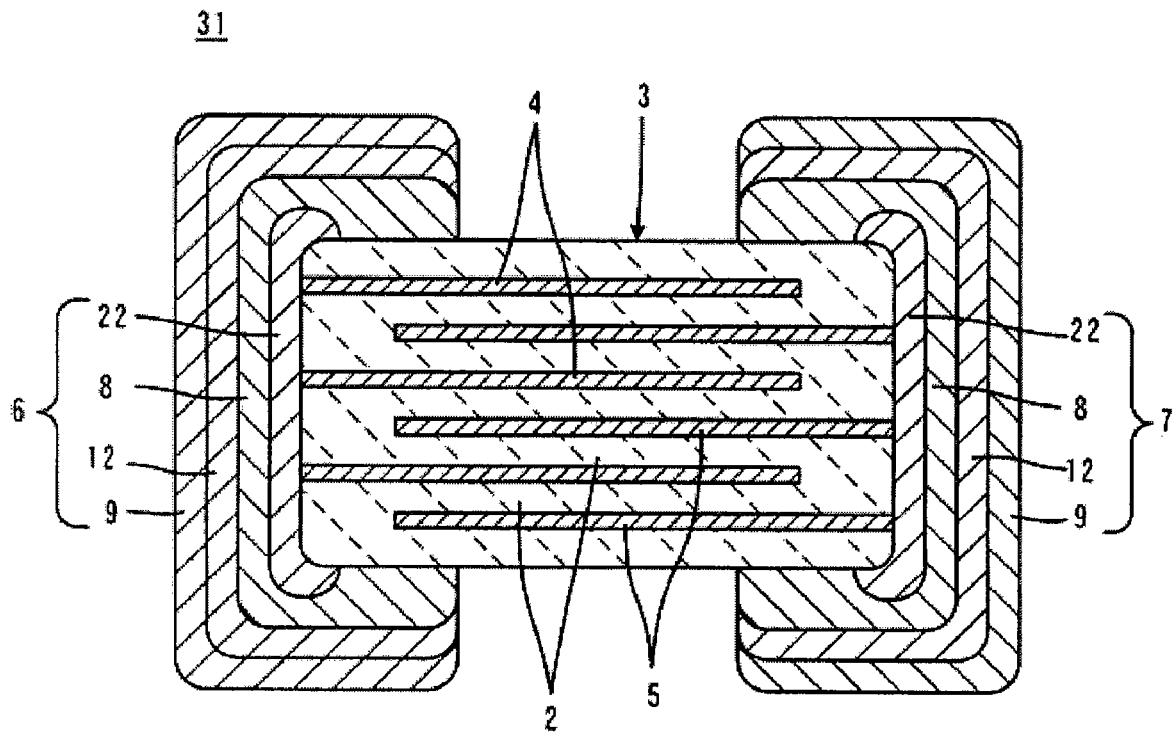
FIG. 4 is a front elevation view schematically illustrating a multilayer ceramic capacitor 31 according to a fourth embodiment of the present invention as viewed in a cross section in the laminating direction.

FIG. 4 illustrates a multilayer ceramic capacitor 31 according to the fourth embodiment of the present invention. The multilayer ceramic capacitor 31 illustrated in FIG. 4 has many components in common with the multilayer ceramic capacitor 1, 11, or 21 illustrated in FIG. 1, 2, or 3. Therefore, the components equivalent to the components illustrated in FIGS. 1 to 3 are designated with the same reference numerals, and the repeated descriptions are omitted.

In the multilayer ceramic capacitor 31 illustrated in FIG. 4, the conduction layer 22 is formed on the ceramic laminate 3, the resistive electrode layers 8 are formed on the conduction layer 22, the outer electrode layers 12 is formed on the resistive electrode layers 8, and the metal plating layer 9 is formed on the outer electrode layers 12 in each of the external electrodes 6 and 7.

According to the fourth embodiment, the effects obtained in the first to third embodiments can be demonstrated.

Figure 5:
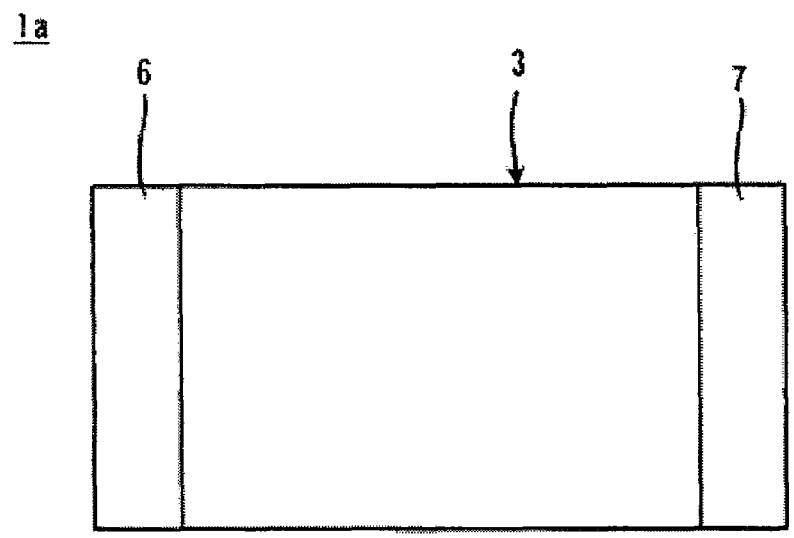
FIG. 5 is a plan view illustrating a first typical example of a multilayer ceramic capacitor to which the present invention is applicable.
Figure 6:
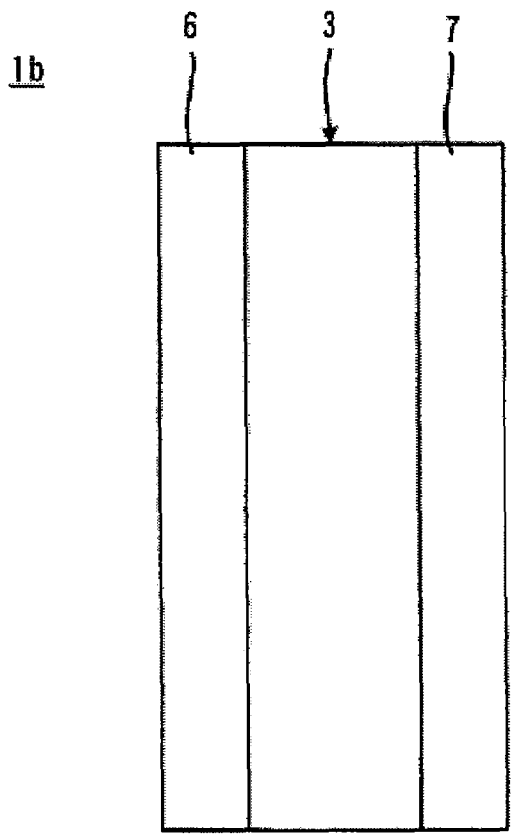
FIG. 6 is a plan view illustrating a second typical example of a multilayer ceramic capacitor to which the present invention is applicable.

FIGS. 1 to 4 are front elevation views schematically illustrating the multilayer ceramic capacitors 1, 11, 21, and 31 as viewed in a cross section in the laminating direction. FIGS. 1 to 4 do not clearly show whether the external electrodes 6 and 7 are formed on the short side or the long side of the ceramic laminate 3 when the ceramic laminate 3 is viewed in the plane direction. The present invention can be applied to the case where the external electrodes 6 and 7 are formed on the short side of the ceramic laminate 3, such as a multilayer ceramic capacitor 1a illustrated in FIG. 5 and also can be applied to the case where the external electrodes 6 and 7 are formed on the long side of the ceramic laminate 3, such as a multilayer ceramic capacitor 1b illustrated in FIG. 6.

Next, experimental examples carried out so as to confirm the effects of the present invention will be described.

Experimental Example 1

In experimental example 1, a multilayer ceramic capacitor having the structure as illustrated in FIG. 2 was produced as a sample.

First, a ceramic laminate for a multilayer ceramic capacitor, which was structured such that the internal electrode contains Ni and that the electrostatic capacitance was 1 μF, was prepared by a known method. The number of ceramic layers of this ceramic laminate was 115 and the dimension thereof was about 1600 μm×about 800 μm×about 45 μm. Each internal electrode had a planar size of about 1300 μm×about 600 μm and was formed on each ceramic layer such that the thickness was about 1 μm. The external electrode of the multilayer ceramic capacitor according to this experimental example was formed on the long side of the ceramic laminate in an application process described later as in a multilayer ceramic capacitor 1b illustrated in FIG. 6.

Separately, a paste used for the formation of the resistive electrode layers was produced as follows.

As a complex oxide which reacts with Ni or M alloy, an In—Sn complex oxide powder was prepared which was obtained by mixing $SnO_2$ powder with $In_2O_3$ powder such that the content of the $SnO_2$ powder was 5% by weight based on the total amount of the $In_2O_3$ powder and the $SnO_2$ powder, calcinating the mixture at a temperature of 1400° C. for 5 hours to form a sufficient solid solution of $SnO_2$, and pulverizing the resultant until the average particle diameter was about 1 μm.

Moreover, a glass frit containing B—Si—Zn—Ba—Ca—Al glass, having a glass softening point of about 560° C., and having an average particle diameter of 1 μm was prepared.

Furthermore, metal powder having an average particle diameter of 1 μm and containing the metal listed in column of "metal type" of Table 1 was prepared.

Next, an organic vehicle containing 20% by weight of acrylic resin was added to and mixed with the In—Sn complex oxide powder prepared as described above, glass frit, and metal powder, and subjecting the mixture to a roll dispersion treatment, thereby obtaining a paste for resistive electrode layers. In this paste, the volume ratio of (total of In—Sn complex oxide powder and metal powder):(glass frit):(organic vehicle) was adjusted to 11.25:13.75:75. In the solid content excluding the organic vehicle in the paste, the weight ratio of (total of In—Sn complex oxide powder and metal powder):(glass frit) was adjusted to 60:40, and the content of the metal powders in the solid content was adjusted as shown in the column of "metal content ratio" of Table 1.

Next, the above-described paste for resistive electrode layers was applied to each end portion of the ceramic laminate prepared as described above by dipping, and then dried at a temperature of 150° C. for 10 minutes. The coating thickness after drying was about 30 μm.

Next, the dried ceramic laminate after the application of the paste for resistive electrode layers as described above was made to pass through a continuous belt furnace, and subjected to a heat treatment in which the ceramic laminate was held in an $N_2$ atmosphere (oxygen concentration: 10 ppm or lower) at the maximum temperature of 700° C. for 15 minutes, thereby forming resistive electrode layers.

Next, outer electrode layers were formed by being printed on the resistive electrode layers using a paste containing Cu powder, glass frit, and an organic vehicle, and further Ni plating and Sn plating were performed, thereby forming a metal plating layer. Thus, a multilayer ceramic capacitor serving as a sample was obtained. As the glass frit to be contained in the paste for ground electrode layer, the same glass frit as the glass frit contained in the paste for resistive electrode layers was used.

The multilayer ceramic capacitor thus obtained was measured for the electrostatic capacitance and ESR. The multilayer ceramic capacitor of each sample was subjected to a thermal shock test (−55° C. to 125° C., 1000 cycles) while the multilayer ceramic capacitor was being mounted on a glass epoxy plate. Thus, the electrostatic capacitance and ESR after the test were determined.

Table 1 shows the initial electrostatic capacitance, the electrostatic capacitance after the thermal shock test, the average ESR, and the variation (3 CV) for 10 samples. The blanks in the column of "ESR" of Table 1 indicate that the measurement was not performed.

TABLE 1

| | | | Initial | | | | After thermal shock test | | | |
|---|---|---|---|---|---|---|---|---|---|---|
| | | Metal content | Electrostatic capacitance | | ESR | | Electrostatic capacitance | | ESR | |
| Sample No. | Metal type | (% by weight) | Average (μF) | 3CV (%) | Average (μF) | 3CV (%) | Average (μF) | 3CV (%) | Average (μF) | 3CV (%) |
| 1 | — | — | 1.07 | 4.2 | 145 | 18.6 | 0.92 | 26.9 | — | — |
| 2 | Ag | 1 | 1.07 | 4.1 | 139 | 16.7 | 0.93 | 32.8 | — | — |
| 3 | Ag | 6 | 1.07 | 4.3 | 101 | 18.1 | 0.89 | 36.5 | — | — |
| 4 | Ag | 9 | 1.07 | 4.2 | 72 | 16.3 | 0.72 | 105.1 | — | — |
| 5 | Ag | 18 | 1.07 | 4.8 | 35 | 15.8 | 0.70 | 89.5 | — | — |
| 6 | Ag | 19 | 1.02 | 6.3 | — | — | 0.66 | 98.8 | — | — |
| 7 | Ag | 25 | 0.83 | 25.9 | — | — | 0.53 | 123.9 | — | — |
| 8 | Cu | 1 | 1.07 | 4.3 | 138 | 15.6 | 1.07 | 4.2 | 136 | 15.8 |
| 9 | Cu | 6 | 1.07 | 3.9 | 108 | 13.8 | 1.07 | 3.9 | 110 | 16.8 |
| 10 | Cu | 9 | 1.07 | 4.5 | 82 | 16.9 | 1.07 | 3.8 | 81 | 15.9 |
| 11 | Cu | 18 | 1.07 | 3.8 | 29 | 18.8 | 1.07 | 4.4 | 31 | 17.2 |
| 12 | Cu | 19 | 1.07 | 4.2 | 3.5 | 14.5 | 1.07 | 4.3 | 3.5 | 16.5 |
| 13 | Cu | 25 | 1.07 | 4.5 | 2.3 | 13.1 | 1.07 | 4.2 | 2.1 | 14.7 |
| 14 | Ni | 1 | 1.07 | 4.3 | 142 | 15.3 | 1.07 | 3.9 | 143 | 15.1 |
| 15 | Ni | 6 | 1.07 | 4.2 | 98 | 17.2 | 1.07 | 4.2 | 102 | 18.8 |
| 16 | Ni | 9 | 1.07 | 3.9 | 70 | 14.6 | 1.07 | 3.8 | 70 | 13.6 |
| 17 | Ni | 18 | 1.07 | 4.8 | 27 | 15.1 | 1.07 | 4.8 | 26 | 13.8 |
| 18 | Ni | 19 | 1.07 | 4.0 | 3.5 | 15.2 | 1.07 | 4.0 | 3.8 | 15.1 |
| 19 | Ni | 25 | 1.07 | 4.6 | 2.5 | 13.1 | 1.07 | 4.9 | 2.6 | 14.1 |

As is clear from the sample 1 results in table 1, when metal powder is not blended in the resistive electrode layers, the initial bonding properties with the internal electrodes were sufficient, and sufficient electrostatic capacitance and a desired ESR were obtained, but, after the thermal shock test, the electrostatic capacitance decreased.

In samples 2 to 7, Ag is blended in the resistive electrode layers 2. When Ag is contained at an Ag content of 18% by weight or lower, as in samples 2 to 5, the initial bonding properties were sufficient and sufficient electrostatic capacitance was obtained. However, in the samples having an Ag content of from 19 to 25% by weight, such as samples 6 and 7, the bonding properties decreased and the electrostatic capacitances decreased. In all samples 2 to 7 containing Ag, the electrostatic capacitances decreased after the thermal shock test. This is possibly because the content of the In—Sn complex oxide decreased with the increase in the content of Ag which hardly forms a solid solution with Ni contained in the internal electrodes.

In samples 8 to 13, Cu is contained in the resistive electrode layers, and, in samples 14 to 19, Ni is contained in the resistive electrode layers. When Cu or Ni were contained, sufficient electrostatic capacitance was obtained irrespective of the increase in the content thereof. This is because Cu and Ni are metals which react with Ni contained in the internal electrodes. However, in samples 12, 13, 18, and 19 having a content of Cu or Ni of 19 to 25% by weight, the ESR decreased to reach several mΩ, and thus the function of increasing the ESR was not substantially performed. This is possibly because metallic conduction due to Cu or Ni which are electrically conductive metals became dominant, and thus the function as the resistive element to be provided by the In—Sn complex oxide and glass was not substantially developed.

The above results reveal that by blending metal, such as Cu or Ni, which reacts with Ni contained in the internal electrodes, in the resistive electrode layers, bonding properties with the internal electrodes increase and sufficient bonding can be maintained after the thermal shock test. It is also revealed that in order to develop an ESR control function by the resistive electrode layers, the content of Cu or Ni needs to be 18% by weight or lower.

Experimental Example 2

In experimental example 2, a multilayer ceramic capacitor having the structure as illustrated in FIG. 4 was produced as a sample.

First, a ceramic laminate for a multilayer ceramic capacitor, which was structured such that the internal electrode contains Ni and that the electrostatic capacitance was 1 μF, was prepared by a known method. Similarly as in the case of experimental example 1, the number of ceramic layers of this ceramic laminate was 115 and the dimension thereof was about 1600 μm×about 800 μm×about 45 μm. The internal electrodes had a planar size of about 1300 μm×about 600 μm and were formed on each ceramic layer such that the thickness was about 1 μm. The external electrode of the multilayer ceramic capacitor according to this experimental example was also formed on the long side of the ceramic laminate in an application process described later as in a multilayer ceramic capacitor 1b illustrated in FIG. 6.

The exposure degree (exposure area of internal electrodes/exposure area of ceramic layer) of the internal electrodes was changed in three ways, i.e., about 0.10, about 0.20, and about 0.25, as shown in Table 2 by changing the polishing state of the end portion of the ceramic laminate.

Separately, a substance containing Ni or Cu powder listed in the column of "conduction layer" of Table 2 was produced for the paste used for the formation of the conduction layer. In more detail, the paste was obtained by adding a slight amount of glass frit (B—Si—Zn—Ba—Ca—Al glass, glass softening point: about 560° C., average particle diameter: about 1 μm) to Ni or Cu powder, mixing this mixture with 20% by weight of organic vehicle containing acrylic resin, and subjecting the resulting mixture to a roll dispersion treatment. The mixing ratio of the paste was adjusted so that the ratio of (metal powder):(glass frit):(organic vehicle) was 22.5:2.5:75 in terms of volume ratio.

Next, the paste for conduction layer was applied to each end portion of the ceramic laminates differing in exposure degree of the internal electrodes by dipping, and dried at a temperature of 150° C. for 10 minutes. During the process, the coating thickness was about 15 μm.

Next, the ceramic laminate to which the paste for conduction layer was applied was made to pass through a continuous belt furnace, and subjected to a heat treatment in which the ceramic laminate was held in an $N_2$ atmosphere (oxygen concentration: 10 ppm or lower) at the maximum temperature of 850° C. for 15 minutes, thereby forming a ceramic laminate on which a conduction layer was formed. Such a conduction layer was not formed on samples 21 to 23.

Next, the paste for resistive electrode layers used in sample 15 in experimental example 1 was prepared. Then, resistive electrode layers were formed, and further outer electrode layers and a metal plating layer were formed in the same manner as in experimental example 1, thereby obtaining a multilayer ceramic capacitor serving as a sample.

The multilayer ceramic capacitor of each sample thus obtained was measured for the electrostatic capacitance and ESR. Moreover, a bending test was performed while the multilayer ceramic capacitor thus obtained of each sample was being mounted on a glass epoxy plate (bending amount: 2 mm), thereby determining the electrostatic capacitance and ESR after the bending test.

The results are shown in Table 2. Table 2 shows the average electrostatic capacitance and ESR for 10 samples.

TABLE 2

| Sample No. | Exposure degree of internal electrode | Conduction layer | Electrostatic capacitance (μF) | | ESR (mΩ) | |
|---|---|---|---|---|---|---|
| | | | Initial | After bending test | Initial | After bending test |
| 21 | 0.10 | None | 1.07 | 0.70 | 223 | — |
| 22 | 0.20 | | 1.07 | 0.75 | 102 | — |
| 23 | 0.25 | | 1.07 | 0.81 | 83 | — |
| 24 | 0.10 | Cu | 1.07 | 1.07 | 27 | 27 |
| 25 | 0.20 | | 1.07 | 1.07 | 25 | 27 |
| 26 | 0.25 | | 1.07 | 1.07 | 25 | 26 |
| 27 | 0.10 | Ni | 1.07 | 1.07 | 29 | 28 |
| 28 | 0.20 | | 1.07 | 1.07 | 28 | 29 |
| 29 | 0.25 | | 1.07 | 1.07 | 28 | 27 |

Table 2 shows that, when the conduction layer was not formed, as in samples 21 to 23, the ESR decreased with an increase in exposure degree of the internal electrodes under the influence of the bonding area with the internal electrodes.

In contrast, when the conduction layer was formed, as in samples 24 to 29, a stable ESR was obtained irrespective of the exposure degree of the internal electrodes.

In samples 21 to 23 in which the conduction layer was not formed, the electrostatic capacitance decreased after the bending test. However, in samples 24 to 29 where the conduction layer was formed, the electrostatic capacitance did not decrease after the bending test, and more preferable results were obtained.

The above results show that by forming the conduction layer, a stronger bonding state with each of the internal electrodes and the resistive electrode layers can be achieved, and ESR fluctuation due to the fluctuation in the exposure degree of the internal electrodes can be suppressed.

Experimental Example 3

In experimental example 3, prior to the stage of the formation of the metal plating layer 9 in the multilayer ceramic capacitor 11 illustrated in FIG. 2 was being produced as a sample, various kinds of glass frit were used as the glass frit to be contained in the paste for the formation of the outer electrode layers 12 to examine the influences of the composition and the glass softening point of the glass on the ESR.

First, a ceramic laminate similarly as in the case of experimental example 1 was prepared. Next, in order to form resistive electrode layers, resistive electrode layers were formed in the same manner as in experimental example 1 using the paste of sample 15 illustrated in Table 1 in experimental example 1.

Separately, as the paste for forming outer electrode layers, a paste containing Cu powder, glass frit, and an organic vehicle and having a volume ratio of (Cu powder):(glass frit):(organic vehicle) adjusted to 20:5:75 was prepared. Here, the Cu powder was a blend of a spherical powder having a particle diameter of 1 μm and a spherical powder having a particle diameter of 0.5 μm in a ratio of 1:1. As the glass frits, six kinds of glass frit having the "glass composition" and the "glass softening point" listed in Table 3 were used. Then, the Cu powder and the glass frit were added to and mixed with 20% by weight of organic vehicle containing acrylic resin, and then the mixture dispersed and kneaded by roll dispersion treatment, thereby obtaining a paste for ground electrode layers.

Next, the paste for ground electrode layer of each sample was applied by dipping onto the resistive electrode layers formed as described above, and dried at a temperature of 150° C. for 10 minutes. The coating thickness after drying was about 80 μm.

Next, the ceramic laminate dried after the formation of the paste for the ground electrode layer as described above was made to pass through a continuous belt furnace, and subjected to a heat treatment in which the ceramic laminate was held in an $N_2$ atmosphere (oxygen concentration: 10 ppm or lower, $H_2O$=0.5 cc/$N_2$=100 L) at the maximum temperature of 680° C. for 15 minutes, thereby forming outer electrode layers.

Each sample obtained through each process was measured for the ESR before the formation of the outer electrode and after the formation of the outer electrode layers, thereby determining the ESR change.

In Table 3, the ESR before the formation of the outer electrode layers is shown in the column of "ESR" and the ESR change after the formation of the outer electrode layers relative to the ESR before the formation of the outer electrode layers is shown in the column of "ESR change". Table 3 shows the average "ESR" and the average "ESR change" for 10 samples.

TABLE 3

| Sample No. | Glass composition | Glass softening point | ESR (mΩ) | ESR change |
|---|---|---|---|---|
| 31 | B—Si—Zn—Ba—Ca | 530° C. | 101 | +4.1% |
| 32 | B—Si—Zn—Ba—Ca | 560° C. | 98 | +1.0% |
| 33 | B—Si—Zn—Ba—Ca | 587° C. | 101 | +4.1% |
| 34 | B—Si—Pb | 547° C. | 111 | +14.4% |
| 35 | B—Si—Na | 571° C. | 115 | +18.6% |
| 36 | B—Si—Zn—Ba—Ca | 519° C. | 197 | +103% |

In Table 3, the glass component of sample 32 is the same as the glass component contained in the resistive electrode layers. Therefore, the resistive electrode layers and the outer electrode layers in sample 32 are the same as the resistive electrode layers and the outer electrode layers in sample 15 in experimental example 1.

As is understood from Table 3, samples 31 to 33 in which the composition system the glass component contained in the outer electrode layers is the same as that of the glass component contained in the resistive electrode and the glass softening point of the glass component contained in the outer electrode layers is 30° C. or less lower than the glass softening point of the glass component contained in the resistive electrode, have an ESR change as small as +5% or lower, and a stable resistance was obtained. Among the above, sample 32 in which the glass component contained in the outer electrode layers is the same as the glass component contained in the resistive electrode layers, had the smallest ESR change.

Moreover, samples 34 and 35 in which the glass softening point of the glass component contained in the outer electrode layers is 30° C. or less lower than the glass softening point of the glass component contained in the resistive electrode but the composition system of the gas component contained in the outer electrode layers is different from that of the glass component contained in the resistive electrode layers, had an ESR change which was relatively high as about +10 to +20%, which was very low ESR change compared with sample 36.

In contrast, sample 36, in which the glass softening point of the glass component contained in the outer electrode layers is lower than a temperature 30° C. or less lower than the glass softening point of the glass component contained in the resistive electrode, had an ESR change exceeding +100%.

These results show that by adjusting the glass softening point of the glass component contained in the outer electrode layers to be 30° C. or less lower than the glass softening point of the glass component contained in the resistive electrode, a stable resistance can be obtained. Furthermore, by making the composition system of the glass component contained in the outer electrode layers the same as the composition system of the glass component contained in the resistive electrode layers, a more stable resistance can be obtained.

Although Cu was used as metal to be contained in the outer electrode layers in experimental example 3, it is confirmed that, even when metal other than Cu, such as Cu alloy, is used, the same results are obtained.

The invention claimed is:
1. A multilayer ceramic capacitor, comprising:
a ceramic laminate including a plurality of ceramic layers;
a pair of internal electrodes disposed at different interfaces between the ceramic layers inside the ceramic laminate; and
a pair of external electrodes disposed on different outer surfaces of the ceramic laminate, each of which is electrically connected to different internal electrodes, each of said internal electrodes comprising Ni or a Ni alloy, each of said external electrodes comprising an resistive electrode layer, each said resistive electrode layer containing metal which reacts with the Ni or Ni alloy as a main component and which directly contacts the ceramic laminate and one of said pair of internal electrodes or directly contacting a conduction layer which directly contacts the ceramic laminate and one of said pair of internal electrodes and, each of said resistive electrode layers containing 26 to 79% by weight of a complex oxide which reacts with Ni or a Ni alloy, 20 to 56% by weight of a glass component, and 1 to 18% by weight of metal which reacts with the Ni or Ni alloy, said reaction forming a solid solution or compound with said Ni or Ni alloy.

2. The multilayer ceramic capacitor according to claim 1, wherein each said resistive electrode layer directly contacts the ceramic laminate and internal electrode and the metal thereof which reacts with the Ni or Ni alloy is at least one of Ni and Cu.

3. The multilayer ceramic capacitor according to claim 2, wherein the complex oxide which reacts with the Ni or Ni alloy is an In—Sn complex oxide.

4. The multilayer ceramic capacitor according to claim 3, wherein said resistive electrode layer contains 55 to 60% by weight of the complex oxide, and 40 to 45% by weight of a glass component.

5. The multilayer ceramic capacitor according to claim 4, wherein a surface of the resistive electrode layers opposing the surface contacting the ceramic laminate has at least one outer electrode layer thereon, and the outer electrode layer(s) contain a glass component having a glass softening point which is 30° C. or less lower than a glass softening point of the glass component in the resistive electrode layers.

6. The multilayer ceramic capacitor according to claim 5, wherein the outer electrode glass component and the resistive electrode layers glass component have the same composition system.

7. The multilayer ceramic capacitor according to claim 6, wherein the outer electrode glass component and the resistive electrode layers glass component have the same softening point.

8. The multilayer ceramic capacitor according to claim 1, wherein each said resistive electrode layer directly contacts the ceramic laminate and internal electrode and in which the complex oxide which reacts with the Ni or Ni is an In—Sn complex oxide.

9. The multilayer ceramic capacitor according to claim 1, wherein each said resistive electrode layer directly contacts a conduction layer and the metal serving as a main component of the conduction layer is at least one of Ni and Cu.

10. The multilayer ceramic capacitor according to claim 9, wherein the metal which reacts with the Ni or Ni alloy in the resistive electrode layers is at least one of Ni and Cu.

11. The multilayer ceramic capacitor according to claim 10, wherein the complex oxide which reacts with the Ni or Ni alloy is an In—Sn complex oxide.

12. The multilayer ceramic capacitor according to claim 11, wherein a surface of the resistive electrode layers opposing the surface contacting the ceramic laminate or the conduction layer has at least one outer electrode layer thereon, and the outer electrode layer(s) contain a glass component having a glass softening point which is 30° C. or less lower than a glass softening point of the glass component in the resistive electrode layers.

13. The multilayer ceramic capacitor according to claim 12, wherein the outer electrode glass component and the resistive electrode layers glass component have the same composition system.

14. The multilayer ceramic capacitor according to claim 13, wherein the outer electrode glass component and the resistive electrode layers glass component have the same softening point.

15. The multilayer ceramic capacitor according to claim 1, wherein said resistive electrode layer contains 55 to 60% by weight of a complex oxide which reacts with Ni or a Ni alloy, and 40 to 45% by weight of a glass component.

16. The multilayer ceramic capacitor according to claim 15, wherein a surface of the resistive electrode layers opposing the surface contacting the ceramic laminate has at least one outer electrode layer thereon, and the outer electrode layer(s) contain a glass component having a glass softening point which is 30° C. or less lower than a glass softening point of the glass component in the resistive electrode layers.

17. The multilayer ceramic capacitor according to claim 16, wherein the outer electrode glass component and the resistive electrode layers glass component have the same composition system.

18. The multilayer ceramic capacitor according to claim 17, wherein the outer electrode glass component and the resistive electrode layers glass component have the same softening point.

19. The multilayer ceramic capacitor according to claim 18, wherein the complex oxide which reacts with the Ni or Ni is an In—Sn complex oxide.

20. The multilayer ceramic capacitor according to claim 1, wherein a surface of the resistive electrode layers opposing the surface contacting the ceramic laminate has at least one outer electrode layer thereon, and the resistive electrode layers and outer electrode layer(s) each contain a glass component having the same composition system and which differ in glass softening point by 30° C. or less.

* * * * *